(12) United States Patent
Alqahtani et al.

(10) Patent No.: US 12,387,307 B2
(45) Date of Patent: Aug. 12, 2025

(54) DETERMINING SEVERITY OF STEPWISE CRACKING IN A PRESSURIZED VESSEL

(71) Applicant: Saudi Arabian Oil Company, Dhahran (SA)

(72) Inventors: Abdulrahman Mohammed Alqahtani, Al Khobar (SA); Maher Hamed Alerwi, Dhahran (SA); Christian Canto Maya, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 385 days.

(21) Appl. No.: 17/974,241

(22) Filed: Oct. 26, 2022

(65) Prior Publication Data

US 2024/0142407 A1     May 2, 2024

(51) Int. Cl.
*G06T 7/00*     (2017.01)
*G01N 29/04*     (2006.01)
(Continued)

(52) U.S. Cl.
CPC ......... *G06T 7/0004* (2013.01); *G01N 29/043* (2013.01); *G01N 29/0609* (2013.01);
(Continued)

(58) Field of Classification Search
CPC ........... G06T 7/0004; G06T 7/10; G06T 7/50; G01N 29/043; G01N 29/0609; G01N 29/069; G01N 2291/2634
See application file for complete search history.

(56) References Cited

U.S. PATENT DOCUMENTS

| 5,140,528 A | 8/1992 | Swaminathan et al. |
| 6,634,236 B2 | 10/2003 | Mars |

(Continued)

FOREIGN PATENT DOCUMENTS

| KR | 200276836 Y1 * | 5/2002 |
| KR | 100821937 | 4/2008 |

OTHER PUBLICATIONS

Atkinson, "The interaction between a crack and an inclusion," International Journal of Engineering Science, 1972, 127-136, 10 pages.

(Continued)

*Primary Examiner* — Henok Shiferaw
*Assistant Examiner* — Woo C Rhim
(74) *Attorney, Agent, or Firm* — Fish & Richardson P.C.

(57) ABSTRACT

To determine severity of stepwise cracking in a pressurized vessel, a computer system receives an image collection of an area of a circumferential wall of the vessel. The image collection includes images distributed across the area, and represent respective cracks on the wall within the area. From among the images, the computer system identifies subsets of images, each including images of adjacent cracks. For the at least two images in each subset, the computer system determines multiple distances, each between an end of an image in each subset and an end of each other image in a subset. Based on the determined multiple distances, the computer system determines a probability of a crack propagating through cracks in each subset. Based on the crack intensity path determined for each subset of the multiple subsets, the computer system determines an operation to be performed on the vessel.

18 Claims, 6 Drawing Sheets

(51) Int. Cl.
　　　*G01N 29/06*　　(2006.01)
　　　*G06T 7/10*　　(2017.01)
　　　*G06T 7/50*　　(2017.01)
(52) U.S. Cl.
　　　CPC ............. *G01N 29/069* (2013.01); *G06T 7/10* (2017.01); *G06T 7/50* (2017.01)

(56) References Cited

U.S. PATENT DOCUMENTS

| | | | |
|---|---|---|---|
| 10,489,903 B2 | 11/2019 | Li et al. | |
| 10,540,760 B2 | 1/2020 | Liu et al. | |
| 2006/0219011 A1* | 10/2006 | Siddu | G01N 29/069 |
| | | | 73/597 |
| 2010/0106430 A1 | 4/2010 | Balestra | |
| 2017/0372196 A1* | 12/2017 | Traidia | G06N 3/042 |
| 2018/0340913 A1* | 11/2018 | Mizuno | G01N 29/265 |
| 2019/0360944 A1* | 11/2019 | Kudo | G01N 21/954 |
| 2021/0174165 A1* | 6/2021 | Traidia | G06N 3/042 |
| 2021/0340857 A1* | 11/2021 | Mohamed Shibly | G06T 7/0002 |
| 2022/0019190 A1* | 1/2022 | Mohamed Shibly | G01N 29/4472 |
| 2022/0207691 A1* | 6/2022 | Kumar | G06V 10/98 |
| 2024/0142407 A1* | 5/2024 | Alqahtani | G01N 29/0609 |

OTHER PUBLICATIONS

Jamshidi et al., "A Big Data Analysis Approach for Rail Failure Risk Assessment," Risk Analysis, 2017, 37: 1495-1507, 13 pages.
Kamaya, "A Crack Growth Evaluation Method for Interacting Multiple Cracks," JSME International Journal Series A Solid Mechanics and Material Engineering, 2003, 46(1):15-23, 9 pages.
Kumar and Curtin, "Crack interaction with microstructure," materials today, Sep. 2007, 10(9): 34-44, 11 pages.
Olson, "Joint pattern development: Effects of subcritical crack growth and mechanical crack interaction," Journal of Geophysical Research, Jul. 1993, 16 pages.

\* cited by examiner

DETERMINING SEVERITY OF STEPWISE CRACKING IN A PRESSURIZED VESSEL

TECHNICAL FIELD

This disclosure relates to computer-implemented methods, computer-readable media and computer systems to evaluate structural damage to vessels, e.g., pressurized vessels or vessels that store fluids such as hydrocarbons.

BACKGROUND

Step-wise cracking (SWC) is a type of crack formation that occurs in carbon steels used to make, for example, pressurization gas vessels that contain hydrocarbons or other fluids such as hydrogen or other gas. Cracks form in the metal in a step-wise pattern. Non-destructive testing (NDT) inspection techniques are used to evaluate cracks present in certain areas of metals. For example, ultrasonic testing (UT) involves passing ultrasonic waves through the metal, receiving reflections of the ultrasonic waves, and converting the reflected waves into images. The image has an appearance in the absence of a crack (e.g., black background color) and has a contrasting appearance in the presence of a crack (e.g., a gray or white color against the black background color).

As pressure within a vessel increases, cracks can propagate (i.e., spread) due to the strain of the internal hydrogen pressure inside laminar cracks. Cracks in adjacent parallel planes can link up in a step-wise manner across the thickness of the vessel wall. Safety issues can arise due to such step-wise crack propagation.

SUMMARY

This disclosure describes computer-implemented methods, computer-readable media and computer systems to determine severity of step-wise cracking in a pressurized vessel.

Certain aspects of the subject matter described here can be implemented as a computer-implemented method. A computer system receives an image collection of an area of a circumferential wall of a vessel. The image collection is captured by ultrasonic testing along a thickness and a length of the circumferential wall. The image collection includes multiple images distributed across the area. The multiple images represent respective multiple cracks on the wall within the area. From among the multiple images, the computer system identifies multiple subsets of images. Each subset includes at least two of the multiple images. Cracks represented by images in a subset are adjacent to each other. For the at least two images in each subset, the computer system determines multiple distances, each determined between an end of an image in each subset and an end of each other image in a subset. Based on the determined multiple distances, the computer system determines a crack intensity path for cracks in the subset. The crack intensity path represents a probability of a crack propagating through cracks represented by the at least two images in each subset. Based on the crack intensity path determined for each subset of the multiple subsets, the computer system determines an operation to be performed on the vessel.

An aspect combinable with any other aspect can include the following features. To determine the crack intensity path, a total length of the cracks in the subset is determined. The total length of the cracks is multiplied by a path angle factor represented by an angle between a line along the thickness of the circumferential wall and a line connecting two cracks that are farthest from each other in the subset. A product of the total length and the path angle factor is divided by a crack interaction path representing a total distance between ends of the two cracks that are farthest from each other in the subset.

An aspect combinable with any other aspect can include the following features. For the at least two images in each subset of the multiple subsets, to determine multiple distances, spatial coordinates of each end in the image collection are identified. Multiple differences corresponding to the multiple distances are determined. Each different is between a spatial coordinate of an end of an image in each subset and a spatial coordinate of an end of each other image in the subset.

An aspect combinable with any other aspect can include the following features. To identify the multiple subsets of images, ends of each crack represented by each image are identified. To identify ends of each crack, a difference in a color of a crack and a color of a portion of the area that excludes a crack is determined.

An aspect combinable with any other aspect can include the following features. The area is divided into three regions. A first region is a sub-area near an outer surface of the circumferential wall. A third region is a sub-area near an inner surface of the circumferential wall. A second region is a sub-area between the first region and the third region. From among the multiple images, an image representing a crack in the first region and an image representing a crack in the third region are identified.

An aspect combinable with any other aspect can include the following features. A shortest distance between an end of a crack in the first region and the outer surface of the circumferential wall is determined. The crack intensity path of a subset that includes a crack in the first region is determined based on the shortest distance between the end of the crack in the first region and the outer surface of the circumferential wall. A shortest distance is determined between an end of a crack in the third region and the inner surface of the circumferential wall. The crack intensity path of a subset that includes a crack in the third region is determined based on the shortest distance between the end of the crack in the third region and the inner surface of the circumferential wall.

An aspect combinable with any other aspect can include the following features. The crack intensity is provided as a percentage. The operation to be performed on the vessel includes planning a repair of the vessel in response to determining the crack intensity to be between 25% and 50%, scheduling immediate repair of the vessel in response to determining the crack intensity to be between 50% and 75%, or shutting down the vessel in response to determining the crack intensity to be greater than 75%.

Certain aspects of the subject matter described here can be implemented as a computer-readable medium (e.g., non-transitory computer-readable medium) storing instructions executable by one or more processors to perform operations described here. Certain aspects of the subject matter described here can be implemented as a computer system that includes one or more processors and a computer-readable medium (e.g., non-transitory computer-readable medium) storing instructions executable by the one or more processors to perform operations described here.

The details of one or more implementations of the subject matter described in this disclosure are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This disclosure describes evaluating cracks present in the thickness of a vessel (e.g., a pressurized oil and gas production trap vessel or a vessel storing pressurized gas such as hydrogen or other gas). A circumferential thickness of the vessel is imaged using non-destructive testing techniques such as ultrasonic testing (UT). The image output by the testing shows the cracks in the thickness of the circumferential wall of the vessel. Using computer-implemented methods, computer-readable media (e.g., non-transitory computer-readable media) and computer systems, cracks that share common characteristics are combined and computationally connected to form clusters of cracks. A crack intensity path (described later) is determined for each cluster. Based on a crack intensity path determined for a cluster, operational decisions are made, such decisions ranging from taking no action (for least crack intensity path) to immediate shutdown (for most crack intensity path).

The computational techniques described in this disclosure are alternative approaches to conventional experimental techniques to evaluate cracks interaction in a step-wise manner. Implementing the techniques described here enables analyzing multiple crack growth behaviors for all possible crack propagation paths. The techniques also offer an ability to rapidly analyze and obtain results about crack severity.

Figure 1:
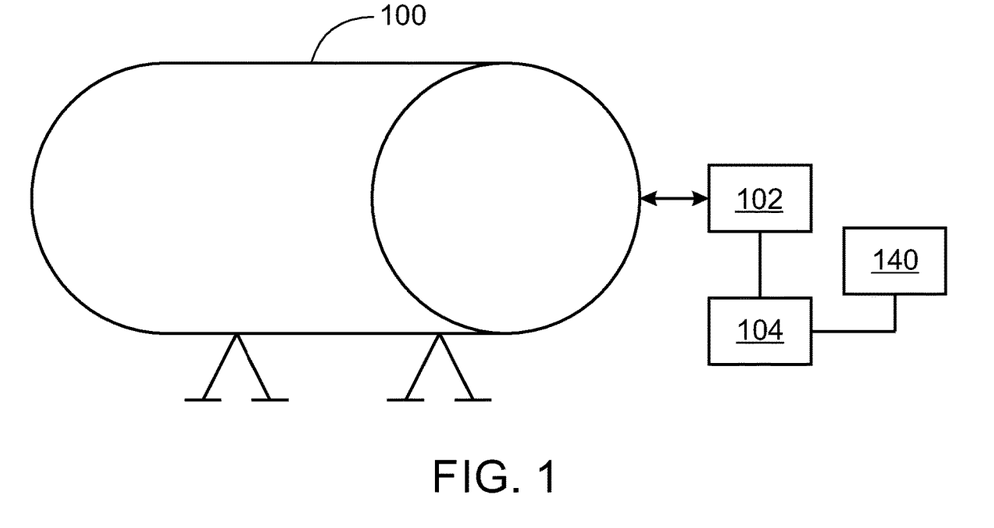
FIG. 1 is a schematic diagram of a vessel subjected to ultrasonic testing.

FIG. 1 is a schematic diagram of a vessel 100 subjected to ultrasonic testing. The vessel 100 can be designed and constructed to store gas, specifically pressurized gas such as hydrogen. In some implementations, the vessel 100 can be a cylindrical vessel with a circular cross-section and a length. In some implementations, the vessel 100 can have any other geometrical shape. All vessels that can be subjected to the techniques described here include a circumferential wall having a thickness and are made of a metal that can form cracks due to the pressure of the gas stored in the vessel.

Figure 2:
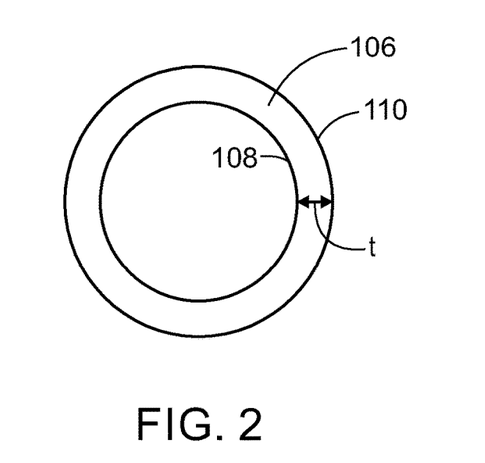
FIG. 2 is a cross-sectional view of the vessel of FIG. 1.

An ultrasonic testing (UT) equipment 102 can be placed proximally to the vessel 100 to perform the ultrasonic testing. The UT equipment 102 is configured to transmit ultrasonic waves through a circumferential wall 106 (FIG. 2) of the vessel 100. FIG. 2 is a cross-sectional view of the vessel 100 and shows a schematic diagram of the circumferential wall 106 having an inner surface 108, an outer surface 110 and a thickness (t). Ultrasonic waves from the UT equipment 102 pass through the circumferential wall 106 along the length the vessel 100. Reflections of the ultrasonic waves are received by the UT equipment 102.

The UT equipment 102 can be operatively coupled to a computer system 104 that includes one or more processors and a computer-readable medium (e.g., non-transitory computer-readable medium) configured to store computer instructions executable by the one or more processors to perform operations described in this disclosure. The UT equipment 102 transmits the received reflections of the ultrasonic waves to the computer system 104. The computer system 104 converts the received reflections into an image, which, for example, can be displayed on a display device. The image represents the circumferential wall 106 of the vessel 100. In some implementations, the image can be a rectangle in which the horizontal dimension (X-axis) is the circumference of the circumferential wall 106 and the vertical dimension (Y-axis) is the thickness (t) of the circumferential wall 106.

Figure 3:
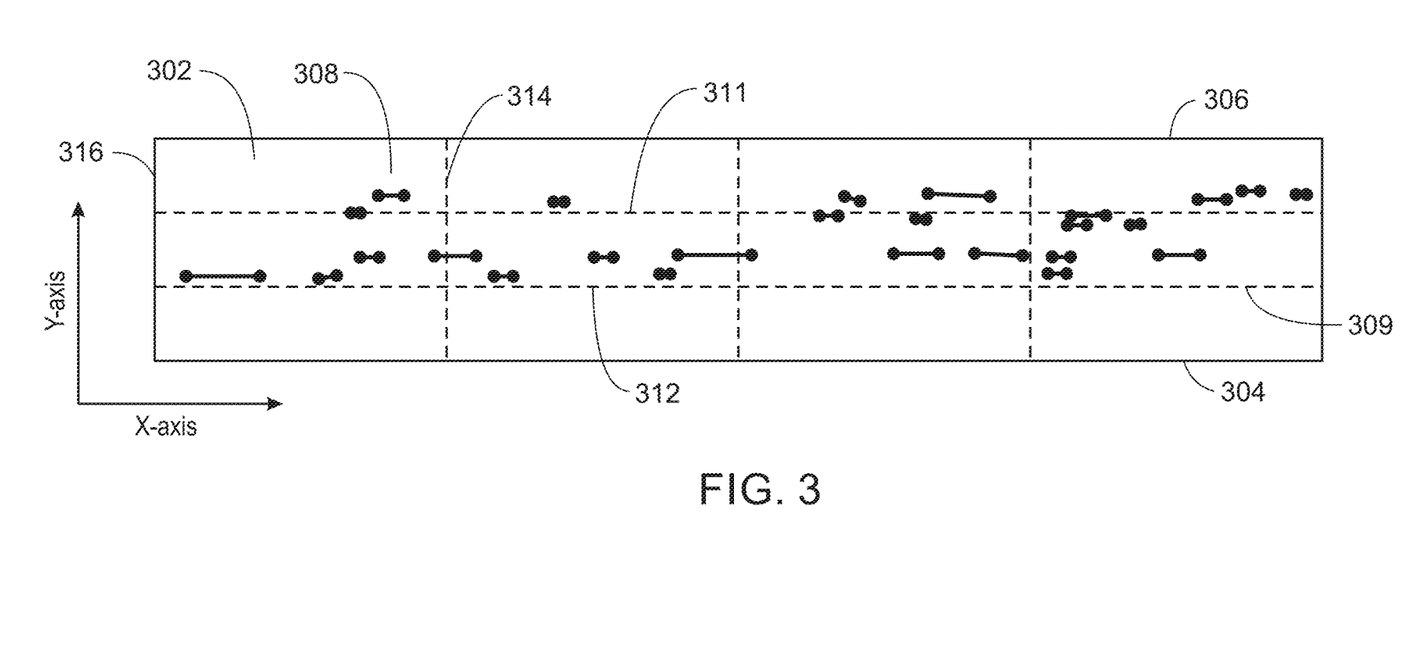
FIG. 3 is a schematic diagram of an image showing cracks in the wall of the vessel of FIG. 1.

FIG. 3 is a schematic diagram of an image 302 showing cracks in the wall of the vessel of FIG. 1. The computer system 104 can generate the image 302 and, in the image 302, display crack-free regions of the circumferential wall 106 in one color (e.g., black or white or other color) and cracks in the circumferential wall 106 in a contrasting color (e.g., white or gray against a black background, or black against a white background). For ease of illustration, crack-free regions have been shown in white and cracks have been shown in black in the image 302. By displaying the cracks in a contrasting color from crack-free regions of the circumferential wall 106, the computer system 104 enables a user to readily identify locations and dimensions of cracks in the circumferential wall 106 of the vessel 100. By implementing the techniques described in this disclosure, the computer system 104 can use the image showing cracks in the circumferential wall 106 to predict crack propagation due to step-wise cracking. Such predictions can allow a user, e.g., an operator of the vessel 100, to take remedial actions in situations in which there is a high likelihood of damage due to step-wise cracking.

As mentioned earlier, the horizontal dimension (X-axis) of the image 302 is the circumference of the circumferential wall 106, and the vertical dimension (Y-axis) of the image 302 is the thickness (t) of the circumferential wall 106. The bottom edge 304 and the top edge 306 of the image 302 are the inner surface 108 and the outer surface 110, respectively, of the circumferential wall 106.

In some implementations, the computer system 104 cluster cracks in the circumferential wall 106 as described here. In a first step, the computer system 104 can divide the image 302 into three regions along the thickness of the circumferential wall 104, i.e., along the Y-axis of the image 302. The first region 308 spans a circumference of the circumferential wall 106 (i.e., the entire horizontal dimension) and is bounded on one edge by the top edge 306 of the image 302 and on the other edge by a line 311 that is at a distance of at most 0.35t from the top edge 306. The third region 310 spans a circumference of the circumferential wall 106 (i.e., the entire horizontal dimension) and is bounded on one edge by the bottom edge 304 of the image 302 and on the other edge by a line 312 that is at a distance of at most 0.35t from the bottom edge 304. The region in between the first region 308 and the third region 310 is the second region 309 (sometimes called the middle region). In some implementations, the lines 311 and 312 equally divide the vertical dimension of the image 302. The computer system 104 can divide the image 302 as described here (and as described elsewhere in this disclosure) using the Cartesian coordinates associated with the X-axis and the Y-axis between the corners of the image 302.

After or in parallel with or before dividing the image 302 into three regions as described earlier or in parallel with dividing the image 302, the computer system 104 can identify the cracks in the circumferential wall 106. As described earlier, the cracks in the circumferential wall 106 are displayed in a color that contrasts with the color of the crack-free portions of the circumferential wall 106. The computer system 104 can identify a crack by performing a pixel-by-pixel scan of the image 302 and comparing a color of each pixel with a color of each adjacent pixel. By doing so, the computer system 104 can identify cracks and crack-free regions in the image 302.

In addition, based on the Cartesian coordinates, the computer system 104 can identify a length of each crack and can also identify cracks that are close to each other. For example, if a comparison of Cartesian coordinates of two cracks reveals that a distance between two cracks is less than half of the sum of the total length of the two cracks, then the computer system 104 can determine that the two cracks are adjacent to each other. Conversely, if a comparison of Cartesian coordinates of two cracks reveals that the distance between the two cracks is greater than half of the sum of the total length of the two cracks, then the computer system 104 can determine that the two cracks are not adjacent to each other. In this manner, for each identified crack, the computer system 104 can compare distances between that crack and every other crack in the image 302 to identify cracks that are adjacent to each other. Having identified adjacent cracks, the computer system 104 can form clusters of cracks, where each cluster includes at least two cracks.

Cracks in a cluster are physically located next to each other on the image 302. In addition, more cracks can be found in the regions nearer the bottom edge 304 and the top edge (i.e., regions 308 and 310) compared to the middle region 312. The computer system 104 can identify a zone as a region of the image 302 that includes all cracks in one cluster. A zone can be bounded horizontally by the bottom edge 304 and the top edge 306, and vertically by the line 314 and the line 316. In the example chosen, the line 316 corresponds to the left vertical edge of the image 302. In other examples, both vertical boundary lines of a zone can reside within the edges of the image 302.

Figures 4, 5:
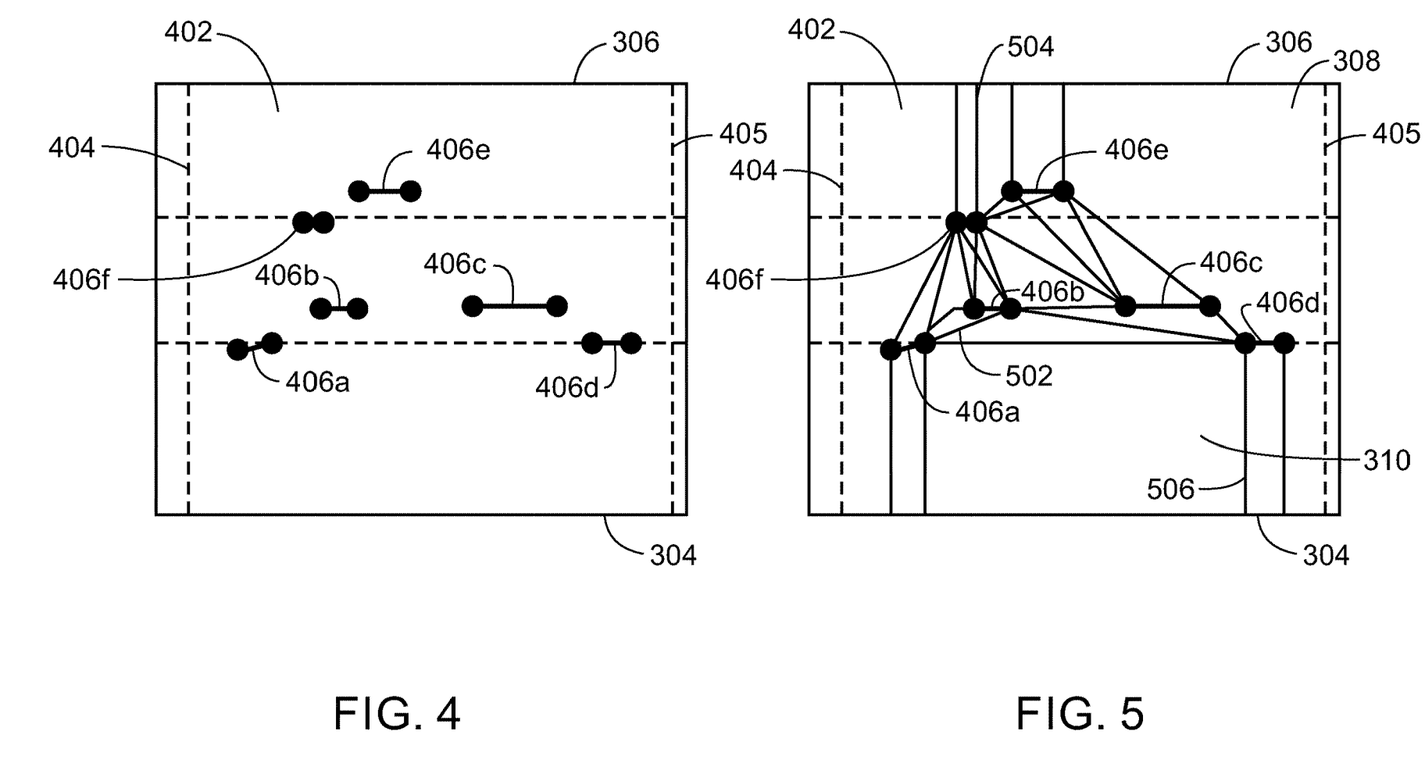
FIG. 4 is a schematic diagram showing combining adjacent cracks in the wall of the vessel of FIG. 1.
FIG. 5 is a schematic diagram showing connecting combined cracks.

FIG. 4 is a schematic diagram showing combining adjacent cracks in the wall of the vessel 100. FIG. 4 also shows a schematic of a zone 402 bounded horizontally by the top edge 306 and the bottom edge 304, and horizontally by the lines 404 and 405. The example zone 402 includes six cracks (406a, 406b, 406c, 406d, 406e, 406f). Each crack has two tips. In the context of this disclosure, step-wise cracking is evaluated by assuming that a new crack will grow from a tip of each crack. The computer system 104 can identify the location (i.e., the Cartesian coordinates) of the tip of each crack by implementing a pixel-by-pixel analysis of the zone 402, e.g., by comparing a color of each pixel with a color of each adjacent pixel. The computer system 104 can implement other types of image processing analyses as well, to identify tips of cracks.

FIG. 5 is a schematic diagram showing connecting combined cracks in zone 402. After identifying all cracks and tips of each crack in a zone such as zone 402, the computer system 104 computationally connects the cracks. To connect the tips in each crack, the computer system 104 determines a distance between a tip of a crack and a tip of another crack. For example, if the Cartesian coordinates of the tip of crack 406a is (x1, y1) and the Cartesian coordinates of the tip of crack 406b is (x2, y2), then the computer system 104 determines the distance between the two cracks using Equation 1 below:

$$(x2-x1)^2+(y2-y1)^2 \qquad \text{(Equation 1)}$$

The distances between two cracks are schematically represented by the lines in FIG. 5. The distance between a tip of the crack 406a and a tip of the crack 406b is identified by reference numeral 502. The computer system 104 stores the distances determined as described here, e.g., in the computer-readable medium.

Also, the computer system 104 computationally connects cracks in the first region 308 with the top edge 306 and cracks in the third region 310 with the bottom edge 304. In particular, for a crack in the first region 308, the computer system 104 determines a shortest distance from each tip of the crack to the top edge 306. In FIG. 5, such a distance from a tip of the crack 406e to the top edge 306 is schematically represented by a line identified by reference numeral 504. Similarly, for a crack in the third region 310, the computer system 104 determines a shortest distance from each tip of the crack to the bottom edge 304. In FIG. 5, such a distance from a tip of the crack 406d to the bottom edge 304 is schematically represented by a line identified by reference numeral 506. Any cracks located in the first region 308 or in the third region 310 are more likely (compared to cracks in the second region 309) to propagate cracks that reach the surface (i.e., the inner surface 108 or the outer surface 110) of the circumferential wall 106 of the vessel 110. The lines linking the tips of cracks in these regions to their corresponding nearest edges represent the likely path of crack propagation. Where multiple cracks are present in the first region 308 or the third region 310, crack propagation to the nearest surface need not occur through each crack. Rather, crack propagation is likely to occur through one of those cracks.

Figure 6:
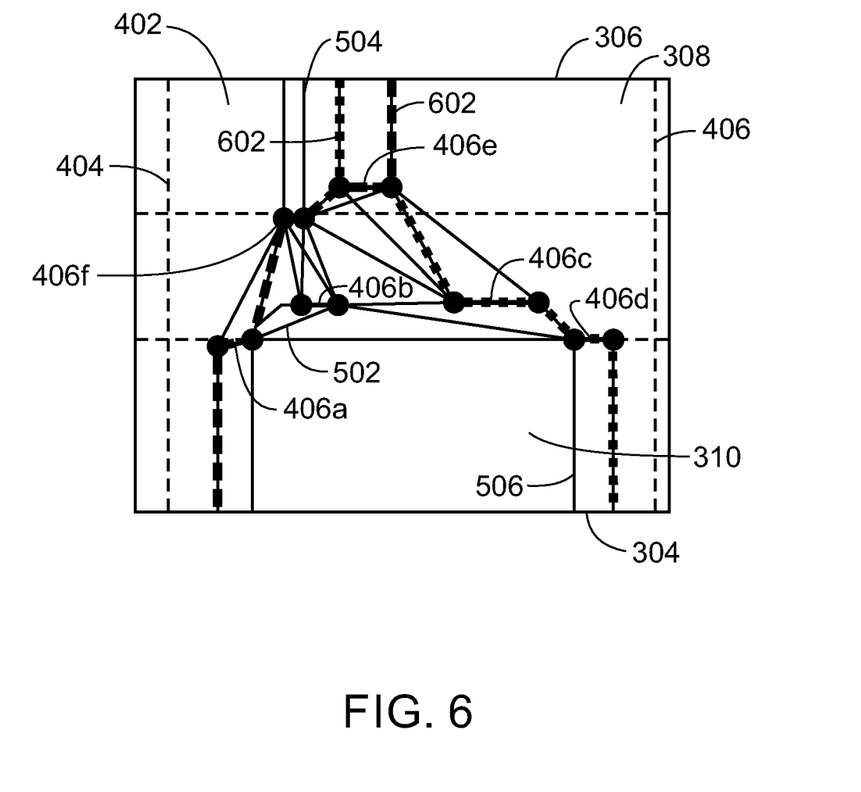
FIG. 6 is a schematic diagram showing a cracks intensity path for connected cracks.

FIG. 6 is a schematic diagram showing a cracks intensity path for connected cracks in a zone 402. The path references the crack propagation path from the inner surface 108 (corresponding to the bottom edge 304 of the image 302) to the outer surface 110 (corresponding to the top edge 306 of the image 302). For a given cluster, the crack intensity path is determined using the length of each crack in the cluster, a path angle factor, and a cracks interaction path. In particular, the computer system 104 determines the cracks intensity path using Equation 2:

$$\text{Cracks Intensity Path} = \frac{C_1 + C_2 + C_3 + \ldots + C_n}{P} \times A \times 100 \qquad \text{(Equation 2)}$$

In Equation 2, $C_1$, $C_2$, $C_3$, $C_n$ are the lengths of cracks in a cluster, e.g., the six cracks in the zone 402; A is a path angle factor; P is a cracks interaction path. The path angle factor (A) is the angle formed by a straight line connecting two of the farthest crack tips in the cluster and a vertical line perpendicular to the top edge 306 or the bottom edge 304. The cracks interaction path (P) is the shortest distance for crack propagation from the top edge 306 of the image 302 (corresponding to the outer surface 110 of the circumferential wall 106) to the bottom edge 304 of the image 302 (corresponding to the inner surface 108 of the circumferential wall 106) going through the existing cracks (C1, C2, C3, Cn). The example zone shown in FIG. 6 shows two potential cracks interaction paths 602 and 604, which is the sum of the length of all possible cracks that can grow through a tip of a crack from either the outer surface 110 or the inner surface 108 (or vice versa). As described earlier, the computer system 104 has previously determined the length of each crack, the shortest distance between a crack nearest to the top edge 306 and the shortest distance between a crack nearest to the bottom edge 304. Using these distances, the computer system 104 determines multiple distances, and selects, as the cracks interaction path, the shortest distance.

In the implementations described earlier, the computer system 104 determines one cracks interaction path for a cluster and determines a cracks intensity path using the determined cracks interaction path. In some implementations, the computer system 104 can determine multiple crack interaction paths and determine a cracks intensity path for each crack interaction path. For example, the computer system 104 can determine a length of each of the lines 602 and 604, and determine two cracks intensity paths by solving Equation 2 using the length of each line.

The computer system 104 can implement the operations described earlier for each cluster in each zone in the image 302. The output of the determinations (i.e., of determining the cracks intensity paths) is a percentage that indicates the likelihood that a crack propagates between the bottom edge 304 (corresponding to the inner surface 108 of the circumferential wall 106) and the top edge 306 (corresponding to the outer surface 110 of the circumferential wall 106) in a zone (corresponding to a portion of the circumferential wall 106). The lower the likelihood, the smaller the need for repair. Conversely, the higher the likelihood, the greater the need for repair or other remedial action.

The computer system 104 can classify the cracks intensity path according to the table shown below.

| Category | Cracks Intensity Path | Action | Alarm |
|---|---|---|---|
| 1 | <25% | No action | No alarm or green light |
| 2 | 25%-49.99% | Plan to repair | Yellow (monitor) |
| 3 | 50%-74.99% | Immediate repair | Orange (commence repair) |
| 4 | >75% | Immediate shutdown | Red (shutdown and repair) |

As described earlier, the output of Equation 2 is a percentage. The percentage indicates a likelihood of crack propagation from the inner surface 108 to the outer surface 110 of the circumferential wall 106. If the cracks intensity path for a zone in the image 302 is less than 25%, then the likelihood of crack propagation through the circumferential wall 106 is small. In such instances, no action need be taken. If the cracks intensity path for a zone in the image 302 is between 25% and 49.99%, then crack propagation through the circumferential wall 106 may occur with continued use of the vessel 100. In such instances, a plan to repair the cracks can be made. If the cracks intensity path for a zone in the image 302 is between 50% and 74.99%, then crack propagation is imminent. In such instances, the circumferential wall 106 can be immediately repaired. If the cracks intensity path for a zone in the image 302 is greater than 75%, then use of the vessel 100 can be immediately shut down and repair commenced.

In some implementations, an alarm system 140 (FIG. 1) can be operatively coupled to the computer system 104. The alarm system 140 can include a visual alarm, e.g., light bulbs of different colors or a light bulb capable of showing different colors, or an audible alarm, e.g., a siren or a speaker or a combination of them. In some implementations, the alarm system 140 can include both the visual alarm and the audible alarm and/or other alarms such as transmitter that can transmit alerts to computer systems such as hand-held devices.

In operation, the computer system 104 can determine that the cracks intensity path for a zone, e.g., zone 402 (FIG. 4), is less than 25%. In response, the computer system 104 can transmit a signal to the visual alarm to turn on a green light. Over time and with continued use of the vessel 100, more cracks can form in the portion of the circumferential wall 106 represented by the zone 402. At that time, the computer system 104 can determine that the cracks intensity path for the zone 402 is between 25% and 49.99%. In response, the computer system 104 can transmit a signal to the visual alarm to turn on a yellow light in place of the green light. As more time passes and with additional use of the vessel 100, the cracks in the portion of the circumferential wall 106 represented by the zone 402 begin to propagate. At that time, the computer system 104 can determine that the cracks intensity path for the zone 402 is between 50% and 74.99%. In response, the computer system 104 can transmit a signal to the visual alarm to turn on an orange light in place of the yellow light. In response, the operator of the vessel 100 can schedule immediate repair of the vessel 100. At any time, if the computer system 104 determines that the cracks intensity path for the zone 402 is greater than 75%, then the computer system 104 can transmit a signal to the visual alarm to turn on a red light in place of the yellow light. In addition, in some implementations, the computer system 104 can automatically shut down operation of the vessel 100.

Operators of the vessels can determine the frequency at which the vessels are to be subjected to ultrasonic testing using the UT equipment 102 and to the analysis implemented by the computer system 104. In some implementations, the testing using the UT equipment 102 and analysis using the computer system 104 can be continuous (i.e., occur at all times). In some implementations, the testing and analysis can be sporadic, e.g., occurring at a frequency of once in 6 months, once a year, once in several (e.g., 5) years. By analyzing the circumferential wall 106 over a period of time, the computer system 104 can develop a crack propagation profile for different zones that collectively represent the circumferential wall 106 along the entire length of the vessel 100.

Figure 7:
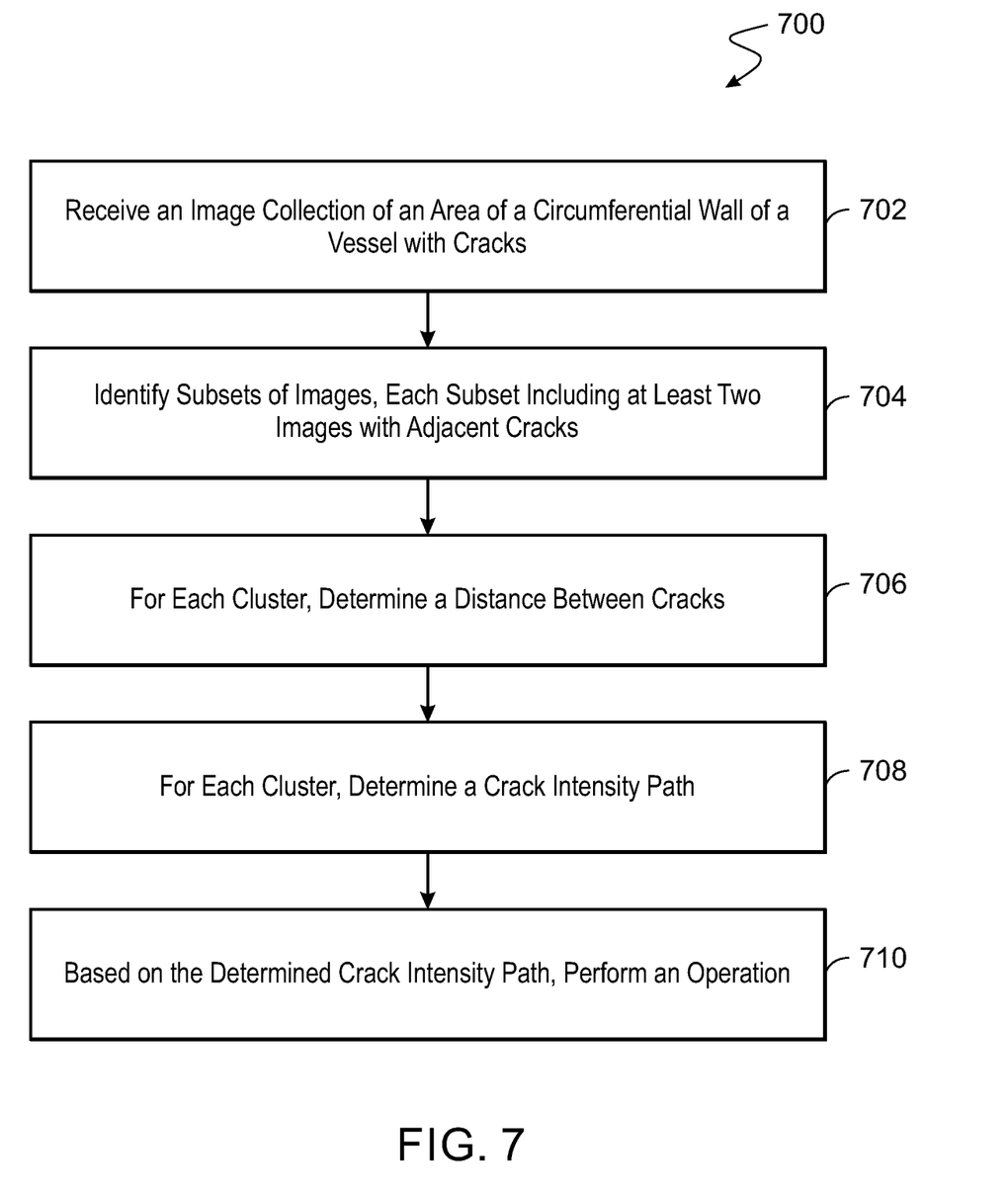
FIG. 7 is a flowchart of an example of a process of classifying a vessel based on cracks intensity paths of connected cracks in the wall of the vessel.

FIG. 7 is a flowchart of an example of a process 700 of classifying a vessel based on cracks intensity paths of connected cracks in the wall of the vessel. In some implementations, the process 700 is performed by the computer system 104. At 702, the computer system 104 receives an image collection of an area of a circumferential wall of a vessel. For example, the computer system 104 receives the image 302 of the circumferential wall 106 of the vessel 100. The area represents a rectangular area in which the horizontal dimension (X-axis) is the circumference of the circumferential wall 106 and the vertical dimension (Y-axis) is the thickness of the circumferential wall 106. The image collection includes multiple images distributed across the area.

The images are those of cracks in the circumferential wall 106 visualized using the UT equipment 102, as described earlier.

At 704, the computer system 104 identifies multiple subsets of images from among the multiple images. Each subset includes at least two images of the multiple images. Cracks represented by images in a subset are adjacent each other. For example, the computer system 104 implements the clustering described earlier to identify cracks in the image 302 that are adjacent each other. The computer system 104 clusters, into a subset, cracks that the computer system 104 determines as being adjacent to each other. In this manner, the computer system 104 determines multiple subsets of images, each subset including images representing cracks that the computer system 104 determines as being adjacent each other.

At 706, for each image in a subset, the computer system 104 determines multiple distances, each distance determined between an end of an image in each subset and an end of each other image in the subset. For example, as described earlier, the computer system 104 determines, using Equation 1, a distance between a tip of each crack in a cluster and a tip of each other crack in the same cluster.

At 708, for each image in a subset, the computer system 104 determines a crack intensity path based on the determined multiple distances. For example, as described earlier, the computer system 104 determines, using Equation 2, a cracks intensity path for the cluster. The computer system 104 repeats this operation to determine a cracks intensity path for each cluster of cracks determined to be adjacent each other.

At 708, the computer system 104 determines an operation to be performed on the vessel based on the cracks intensity path determined for each subset. For example, in response to determining that the cracks intensity path for a cluster is between 50% and 74.99%, the computer system 104 can trigger an alarm system to initiate immediate shutdown and repair of the vessel 100. In some implementations, in response to determining that the cracks intensity path for a cluster is greater than 75%, the computer system 104 can automatically trigger shutdown of operations involving the vessel 100. In such implementations, the computer system 104 can be configured to not permit restarting operations until the cracks intensity path for all regions of the circumferential wall 106 are below a certain threshold, e.g., 50%.

Figure 8:
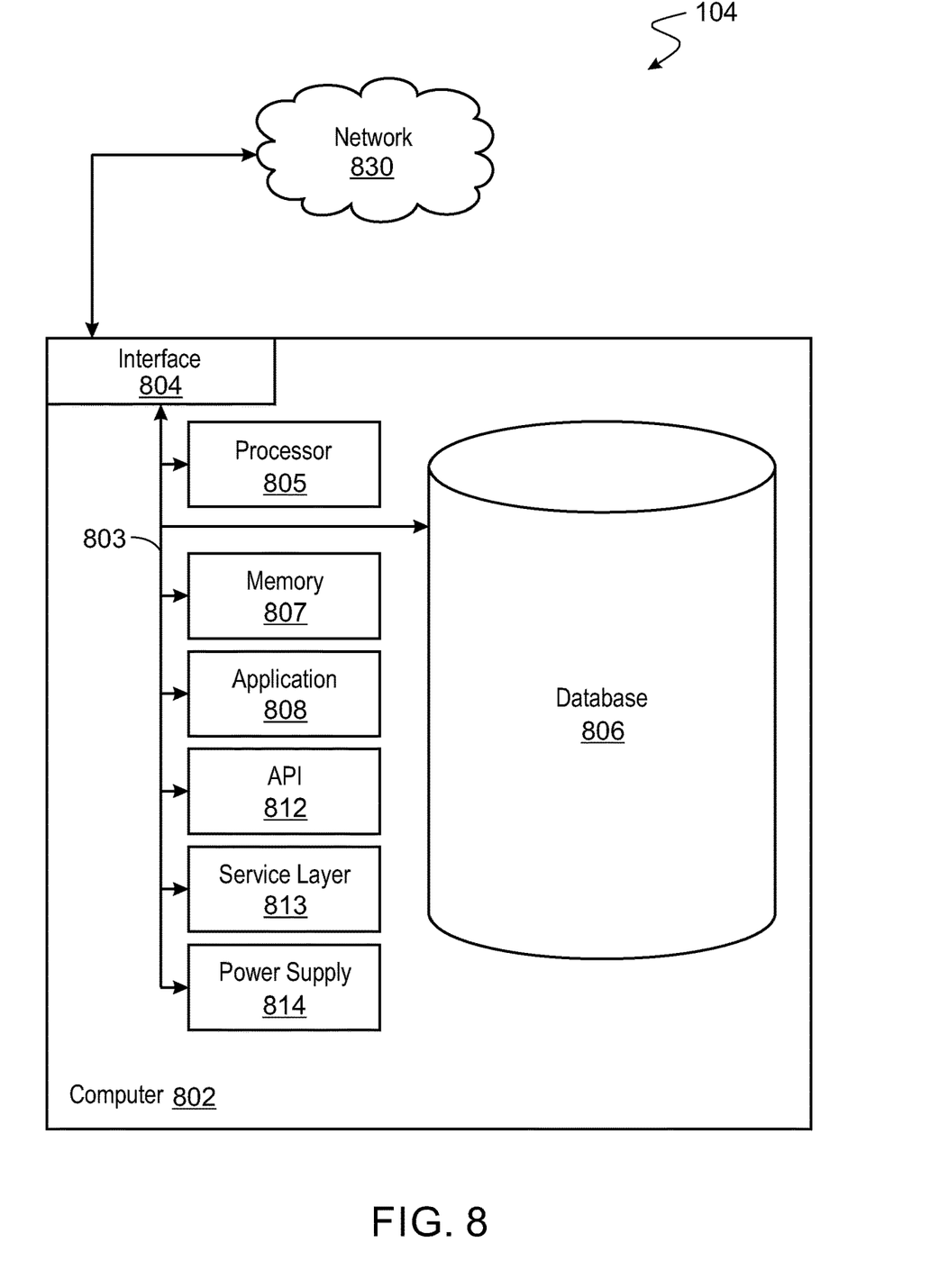
FIG. 8 is a block diagram illustrating an example computer system used to provide computational functionalities associated with described algorithms, methods, functions, processes, flows, and procedures as described in the present disclosure, according to some implementations of the present disclosure.

FIG. 8 is a block diagram illustrating an example computer system used to provide computational functionalities associated with described algorithms, methods, functions, processes, flows, and procedures as described in the present disclosure, according to some implementations of the present disclosure. FIG. 8 is a block diagram of an example computer system 104 used to provide computational functionalities associated with described algorithms, methods, functions, processes, flows, and procedures described in the present disclosure, according to some implementations of the present disclosure. The illustrated computer 802 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 802 can include input devices such as keypads, keyboards, and touch screens that can accept user information. Also, the computer 802 can include output devices that can convey information associated with the operation of the computer 802. The information can include digital data, visual data, audio information, or a combination of information. The information can be presented in a graphical user interface (UI) (or GUI).

The computer 802 can serve in a role as a client, a network component, a server, a database, a persistency, or components of a computer system for performing the subject matter described in the present disclosure. The illustrated computer 802 is communicably coupled with a network 830. In some implementations, one or more components of the computer 802 can be configured to operate within different environments, including cloud-computing-based environments, local environments, global environments, and combinations of environments.

At a top level, the computer 802 is an electronic computing device operable to receive, transmit, process, store, and manage data and information associated with the described subject matter. According to some implementations, the computer 802 can also include, or be communicably coupled with, an application server, an email server, a web server, a caching server, a streaming data server, or a combination of servers.

The computer 802 can receive requests over network 830 from a client application (for example, executing on another computer 802). The computer 802 can respond to the received requests by processing the received requests using software applications. Requests can also be sent to the computer 802 from internal users (for example, from a command console), external (or third) parties, automated applications, entities, individuals, systems, and computers.

Each of the components of the computer 802 can communicate using a system bus 803. In some implementations, any or all of the components of the computer 802, including hardware or software components, can interface with each other or the interface 804 (or a combination of both) over the system bus 803. Interfaces can use an application programming interface (API) 812, a service layer 813, or a combination of the API 812 and service layer 813. The API 812 can include specifications for routines, data structures, and object classes. The API 812 can be either computer-language independent or dependent. The API 812 can refer to a complete interface, a single function, or a set of APIs.

The service layer 813 can provide software services to the computer 802 and other components (whether illustrated or not) that are communicably coupled to the computer 802. The functionality of the computer 802 can be accessible for all service consumers using this service layer. Software services, such as those provided by the service layer 813, can provide reusable, defined functionalities through a defined interface. For example, the interface can be software written in JAVA, C++, or a language providing data in extensible markup language (XML) format. While illustrated as an integrated component of the computer 802, in alternative implementations, the API 812 or the service layer 813 can be stand-alone components in relation to other components of the computer 802 and other components communicably coupled to the computer 802. Moreover, any or all parts of the API 812 or the service layer 813 can be implemented as child or sub-modules of another software module, enterprise application, or hardware module without departing from the scope of the present disclosure.

The computer 802 includes an interface 804. Although illustrated as a single interface 804 in FIG. 8, two or more interfaces 804 can be used according to particular needs, desires, or particular implementations of the computer 802 and the described functionality. The interface 804 can be used by the computer 802 for communicating with other systems that are connected to the network 830 (whether illustrated or not) in a distributed environment. Generally, the interface 804 can include, or be implemented using, logic encoded in software or hardware (or a combination of software and hardware) operable to communicate with the network 830. More specifically, the interface 804 can include software supporting one or more communication protocols associated with communications. As such, the network 830 or the interface's hardware can be operable to communicate physical signals within and outside of the illustrated computer 802.

The computer 802 includes a processor 805. Although illustrated as a single processor 805 in FIG. 8, two or more processors 805 can be used according to particular needs, desires, or particular implementations of the computer 802 and the described functionality. Generally, the processor 805 can execute instructions and can manipulate data to perform the operations of the computer 802, including operations using algorithms, methods, functions, processes, flows, and procedures as described in the present disclosure.

The computer 802 also includes a database 806 that can hold data for the computer 802 and other components connected to the network 830 (whether illustrated or not). For example, database 806 can be an in-memory, conventional, or a database storing data consistent with the present disclosure. In some implementations, database 806 can be a combination of two or more different database types (for example, hybrid in-memory and conventional databases) according to particular needs, desires, or particular implementations of the computer 802 and the described functionality. Although illustrated as a single database 806 in FIG. 8, two or more databases (of the same, different, or combination of types) can be used according to particular needs, desires, or particular implementations of the computer 802 and the described functionality. While database 806 is illustrated as an internal component of the computer 802, in alternative implementations, database 806 can be external to the computer 802.

The computer 802 also includes a memory 807 that can hold data for the computer 802 or a combination of components connected to the network 830 (whether illustrated or not). Memory 807 can store any data consistent with the present disclosure. In some implementations, memory 807 can be a combination of two or more different types of memory (for example, a combination of semiconductor and magnetic storage) according to particular needs, desires, or particular implementations of the computer 802 and the described functionality. Although illustrated as a single memory 807 in FIG. 8, two or more memories 807 (of the same, different, or combination of types) can be used according to particular needs, desires, or particular implementations of the computer 802 and the described functionality. While memory 807 is illustrated as an internal component of the computer 802, in alternative implementations, memory 807 can be external to the computer 802.

The application 808 can be an algorithmic software engine providing functionality according to particular needs, desires, or particular implementations of the computer 802 and the described functionality. For example, application 808 can serve as one or more components, modules, or applications. Further, although illustrated as a single application 808, the application 808 can be implemented as multiple applications 808 on the computer 802. In addition, although illustrated as internal to the computer 802, in alternative implementations, the application 808 can be external to the computer 802.

The computer 802 can also include a power supply 814. The power supply 814 can include a rechargeable or non-rechargeable battery that can be configured to be either user- or non-user-replaceable. In some implementations, the power supply 814 can include power-conversion and management circuits, including recharging, standby, and power management functionalities. In some implementations, the power supply 814 can include a power plug to allow the computer 802 to be plugged into a wall socket or a power source to, for example, power the computer 802 or recharge a rechargeable battery.

There can be any number of computers 802 associated with, or external to, a computer system containing computer 802, with each computer 802 communicating over network 830. Further, the terms "client," "user," and other appropriate terminology can be used interchangeably, as appropriate, without departing from the scope of the present disclosure. Moreover, the present disclosure contemplates that many users can use one computer 802 and one user can use multiple computers 802.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. For example, the signal can be a machine-generated electrical, optical, or electromagnetic signal that is generated to encode information for transmission to a suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatuses, devices, and machines for processing data, including by way of example, a programmable processor, a computer, or multiple processors or computers. The apparatus can also include special purpose logic circuitry including, for example, a central processing unit (CPU), a field-programmable gate array (FPGA), or an application-specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, such as LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub-programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory.

Graphics processing units (GPUs) can also be used in combination with CPUs. The GPUs can provide specialized processing that occurs in parallel to processing performed by CPUs. The specialized processing can include artificial intelligence (AI) applications and processing, for example. GPUs can be used in GPU clusters or in multi-GPU computing.

A computer can include, or be operatively coupled to, one or more mass storage devices for storing data. In some implementations, a computer can receive data from, and transfer data to, the mass storage devices including, for example, magnetic, magneto-optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer-readable media (transitory or non-transitory, as appropriate) suitable for storing computer program instructions and data can include all forms of permanent/non-permanent and volatile/non-volatile memory, media, and memory devices. Computer-readable media can include, for example, semiconductor memory devices such as random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer-readable media can also include, for example, magnetic devices such as tape, cartridges, cassettes, and internal/removable disks. Computer-readable media can also include magneto-optical disks and optical memory devices and technologies including, for example, digital video disc (DVD), CD-ROM, DVD+/–R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated into, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that the user uses. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch-screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of the exchange file system can be done at the application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations. It should be understood that the described program components and systems can generally be integrated together in a single software product or packaged into multiple software products.

Accordingly, the previously described example implementations do not define or constrain the present disclosure.

Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system including a computer memory interoperably coupled with a hardware processor configured to perform the computer-implemented method or the instructions stored on the non-transitory, computer-readable medium.

The invention claimed is:

1. A computer-implemented method comprising:
  receiving an image collection of an area of a circumferential wall of a vessel, the image collection captured by ultrasonic testing along a thickness and a length of the circumferential wall, the image collection comprising a plurality of images distributed across the area, the plurality of images representing a respective plurality of cracks on the wall within the area;
  identifying, from among the plurality of images, a plurality of subsets of images, each subset including at least two images of the plurality of images, cracks represented by images in a subset are adjacent each other;
  for the at least two images in each subset of the plurality of subsets:
    determining a plurality of distances, each distance determined between an end of an image in each subset and an end of each other image in the subset, and
    determining, based on the determined plurality of distances, a crack intensity path for cracks in the subset, the crack intensity path representing a probability of a crack propagating through cracks represented by the at least two images in each subset;
  determining, based on the crack intensity path determined for each subset of the plurality of subsets, an operation to be performed on the vessel;
  providing the crack intensity as a percentage, wherein the operation to be performed on the vessel comprises:
    planning a repair of the vessel in response to determining the crack intensity to be between 25% and 50%; or
    scheduling immediate repair of the vessel in response to determining the crack intensity to be between 50% and 75%; or
    shutting down the vessel in response to determining the crack intensity to be greater than 75%.

2. The computer-implemented method of claim 1, wherein determining the crack intensity path comprises:
  determining a total length of the cracks in the subset;
  multiplying the total length of the cracks by a path angle factor represented by an angle between a line along the thickness of the circumferential wall and a line connecting two cracks that are farthest from each other in the subset; and
  dividing a product of the total length and the path angle factor by a crack interaction path representing a total distance between ends of the two cracks that are farthest from each other in the subset.

3. The computer-implemented method of claim 1, wherein for the at least two images in each subset of the plurality of subsets, determining the plurality of distances comprises:

identifying spatial coordinates of each end in the image collection; and determining a plurality of differences corresponding to the plurality of distances, each difference being between a spatial coordinate of an end of an image in each subset and a spatial coordinate of an end of each other image in the subset.

4. The computer-implemented method of claim 1, wherein identifying the plurality of subsets of images comprises identifying ends of each crack represented by each image, wherein identifying the ends of each crack comprises determining a difference in a color of a crack and a color of a portion of the area that excludes a crack.

5. The computer-implemented method of claim 1, further comprising:

dividing the area into three regions, a first region being a sub-area near an outer surface of the circumferential wall, a third region being a sub-area near an inner surface of the circumferential wall, and a second region being a sub-area between the first region and the third region;

identifying, from among the plurality of images, an image representing a crack in the first region; and identifying, from among the plurality of images, an image representing a crack in the third region.

6. The computer-implemented method of claim 5, further comprising:

determining a shortest distance between an end of a crack in the first region and the outer surface of the circumferential wall, wherein the crack intensity path of a subset that includes a crack in the first region is determined based on the shortest distance between the end of the crack in the first region and the outer surface of the circumferential wall; and determining a shortest distance between an end of a crack in the third region and the inner surface of the circumferential wall, wherein the crack intensity path of a subset that includes a crack in the third region is determined based on the shortest distance between the end of the crack in the third region and the inner surface of the circumferential wall.

7. A non-transitory computer-readable medium storing instructions executable by one or more processors to perform operations comprising:

receiving an image collection of an area of a circumferential wall of a vessel, the image collection captured by ultrasonic testing along a thickness and a length of the circumferential wall, the image collection comprising a plurality of images distributed across the area, the plurality of images representing a respective plurality of cracks on the wall within the area;

identifying, from among the plurality of images, a plurality of subsets of images, each subset including at least two images of the plurality of images, cracks represented by images in a subset are adjacent each other;

for the at least two images in each subset of the plurality of subsets:

determining a plurality of distances, each distance determined between an end of an image in each subset and an end of each other image in the subset, and determining, based on the determined plurality of distances, a crack intensity path for cracks in the subset, the crack intensity path representing a probability of a crack propagating through cracks represented by the at least two images in each subset;

determining, based on the crack intensity path determined for each subset of the plurality of subsets, an operation to be performed on the vessel; and providing the crack intensity as a percentage, wherein the operation to be performed on the vessel comprises:

planning a repair of the vessel in response to determining the crack intensity to be between 25% and 50%; or scheduling immediate repair of the vessel in response to determining the crack intensity to be between 50% and 75%; or shutting down the vessel in response to determining the crack intensity to be greater than 75%.

8. The non-transitory computer-readable medium of claim 7, wherein determining the crack intensity path comprises:

determining a total length of the cracks in the subset;

multiplying the total length of the cracks by a path angle factor represented by an angle between a line along the thickness of the circumferential wall and a line connecting two cracks that are farthest from each other in the subset; and dividing a product of the total length and the path angle factor by a crack interaction path representing a total distance between ends of the two cracks that are farthest from each other in the subset.

9. The non-transitory computer-readable of claim 7, wherein for the at least two images in each subset of the plurality of subsets, determining the plurality of distances comprises:

identifying spatial coordinates of each end in the image collection; and determining a plurality of differences corresponding to the plurality of distances, each difference being between a spatial coordinate of an end of an image in each subset and a spatial coordinate of an end of each other image in the subset.

10. The non-transitory computer-readable of claim 7, wherein identifying the plurality of subsets of images comprises identifying ends of each crack represented by each image, wherein identifying the ends of each crack comprises determining a difference in a color of a crack and a color of a portion of the area that excludes a crack.

11. The non-transitory computer-readable of claim 7, the operations further comprise:

dividing the area into three regions, a first region being a sub-area near an outer surface of the circumferential wall, a third region being a sub-area near an inner surface of the circumferential wall, and a second region being a sub-area between the first region and the third region;

identifying, from among the plurality of images, an image representing a crack in the first region; and identifying, from among the plurality of images, an image representing a crack in the third region.

12. The non-transitory computer-readable of claim 11, the operations further comprise:

determining a shortest distance between an end of a crack in the first region and the outer surface of the circumferential wall, wherein the crack intensity path of a subset that includes a crack in the first region is determined based on the shortest distance between the end of the crack in the first region and the outer surface of the circumferential wall; and determining a shortest distance between an end of a crack in the third region and the inner surface of the circumferential wall, wherein the crack intensity path of a subset that includes a crack in the third region is determined based on the shortest distance between the end of the crack in the third region and the inner surface of the circumferential wall.

13. A system comprising:
one or more processors; and
a computer-readable medium storing instructions executable by the one or more processors to perform operations comprising:
receiving an image collection of an area of a circumferential wall of a vessel, the image collection captured by ultrasonic testing along a thickness and a length of the circumferential wall, the image collection comprising a plurality of images distributed across the area, the plurality of images representing a respective plurality of cracks on the wall within the area;
identifying, from among the plurality of images, a plurality of subsets of images, each subset including at least two images of the plurality of images, cracks represented by images in a subset are adjacent each other;
for the at least two images in each subset of the plurality of subsets:
determining a plurality of distances, each distance determined between an end of an image in each subset and an end of each other image in the subset, and
determining, based on the determined plurality of distances, a crack intensity path for cracks in the subset, the crack intensity path representing a probability of a crack propagating through cracks represented by the at least two images in each subset;
determining, based on the crack intensity path determined for each subset of the plurality of subsets, an operation to be performed on the vessel; and
providing the crack intensity as a percentage, wherein the operation to be performed on the vessel comprises:
planning a repair of the vessel in response to determining the crack intensity to be between 25% and 50%; or
scheduling immediate repair of the vessel in response to determining the crack intensity to be between 50% and 75%; or
shutting down the vessel in response to determining the crack intensity to be greater than 75%.

14. The system of claim 13, wherein determining the crack intensity path comprises:
determining a total length of the cracks in the subset;
multiplying the total length of the cracks by a path angle factor represented by an angle between a line along the thickness of the circumferential wall and a line connecting two cracks that are farthest from each other in the subset; and
dividing a product of the total length and the path angle factor by a crack interaction path representing a total distance between ends of the two cracks that are farthest from each other in the subset.

15. The system of claim 13, wherein for the at least two images in each subset of the plurality of subsets, determining the plurality of distances comprises:
identifying spatial coordinates of each end in the image collection; and
determining a plurality of differences corresponding to the plurality of distances, each difference being between a spatial coordinate of an end of an image in each subset and a spatial coordinate of an end of each other image in the subset.

16. The system of claim 13, wherein identifying the plurality of subsets of images comprises identifying ends of each crack represented by each image, wherein identifying the ends of each crack comprises determining a difference in a color of a crack and a color of a portion of the area that excludes a crack.

17. The system of claim 13, the operations further comprise:
dividing the area into three regions, a first region being a sub-area near an outer surface of the circumferential wall, a third region being a sub-area near an inner surface of the circumferential wall, and a second region being a sub-area between the first region and the third region;
identifying, from among the plurality of images, an image representing a crack in the first region; and
identifying, from among the plurality of images, an image representing a crack in the third region.

18. The system of claim 17, the operations further comprise:
determining a shortest distance between an end of a crack in the first region and the outer surface of the circumferential wall, wherein the crack intensity path of a subset that includes a crack in the first region is determined based on the shortest distance between the end of the crack in the first region and the outer surface of the circumferential wall; and
determining a shortest distance between an end of a crack in the third region and the inner surface of the circumferential wall, wherein the crack intensity path of a subset that includes a crack in the third region is determined based on the shortest distance between the end of the crack in the third region and the inner surface of the circumferential wall.

* * * * *